United States Patent [19]

Baumgartner et al.

[11] Patent Number: 5,278,253
[45] Date of Patent: Jan. 11, 1994

[54] PREPARATION OF ABS MOLDING MATERIALS

[75] Inventors: Ehrenfried Baumgartner, Roedersheim-Gronau; Juergen Hormann, Ludwigshafen; Rainer Moors, Limburgerhof; Hansjoerg Schaech, Ludwigshafen, all of Fed. Rep. of Germany

[73] Assignee: BASF Aktiengesellschaft, Ludwigshafen, Fed. Rep. of Germany

[21] Appl. No.: 764,866

[22] Filed: Sep. 24, 1991

[30] Foreign Application Priority Data

Sep. 26, 1990 [DE] Fed. Rep. of Germany ....... 4030352

[51] Int. Cl.$^5$ ............................................ C08F 279/02
[52] U.S. Cl. ..................................... 525/316; 525/52; 422/203; 422/225
[58] Field of Search .................................. 525/52, 316

[56] References Cited

U.S. PATENT DOCUMENTS

| | | |
|---|---|---|
| 3,243,481 | 3/1966 | Ruffing et al. . |
| 4,198,383 | 4/1980 | Konsetov et al. . |
| 4,252,911 | 2/1981 | Simon . |
| 4,282,334 | 8/1981 | Walter et al. ........................ 525/53 |
| 4,410,659 | 10/1983 | Lee et al. . |
| 4,421,895 | 12/1983 | Echte et al. . |
| 4,925,896 | 5/1990 | Matarrese et al. .................. 525/316 |

FOREIGN PATENT DOCUMENTS

| | | |
|---|---|---|
| 054141 | 6/1982 | European Pat. Off. . |
| 067536 | 12/1982 | European Pat. Off. . |
| 103657 | 3/1984 | European Pat. Off. . |
| 352383 | 1/1990 | European Pat. Off. . |
| 3339531 | 5/1984 | Fed. Rep. of Germany . |

OTHER PUBLICATIONS

European Search Report Apr. 1992.
JP 54/070 350 Chem. Abst. Jun. 1979.
JP 63/207/803 Chem. Abst. Aug. 1988.
JP 63/207 804 Chem. Abst. Aug. 1988.
JP 63/199 717 Chem. Abst. Aug. 1988.

Primary Examiner—James J. Seidleck
Assistant Examiner—Vasu S. Jagannathan
Attorney, Agent, or Firm—Keil & Weinkauf

[57] ABSTRACT

A process for the continuous preparation of ABS polymers by free-radical-initiated polymerization of, in particular, styrene and acrylonitrile in the presence of polybutadiene, in the presence or absence of a solvent, in a reactor cascade comprising at least 3 stirred reactors operating essentially without back-mixing, at least some of which contain internal cooling tubes for dissipating the heat of polymerization, at from 50 to 180° C., phase inversion taking place in one of the reactors which contains means for generating a high shear force, and an apparatus for carrying out the process comprising an essentially cylindrical/tubular vessel jacket and a cylindrical internal element connected to a stirrer shaft by rotational force and having an external diameter which is slightly less than the internal diameter of the vessel jacket.

3 Claims, 1 Drawing Sheet

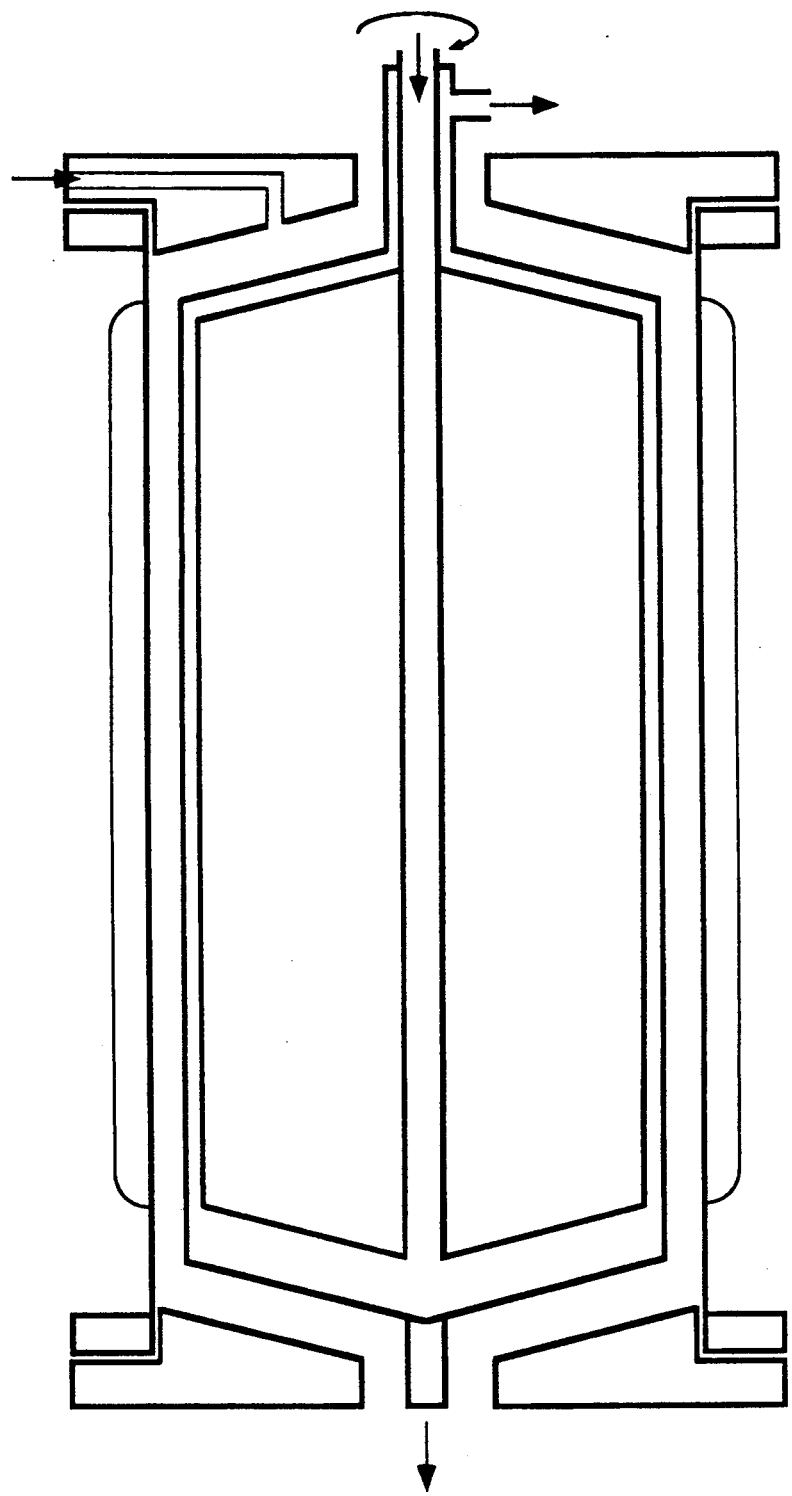

PREPARATION OF ABS MOLDING MATERIALS

The present invention relates to a continuous process for the preparation of high-impact polystyrene (ABS) whose dispersed rubber particles have diameters of less than 500 nm, by bulk or solution polymerization in more than two reaction zones using a free-radical initiator and possibly a chain-transfer agent (regulator).

The following publications, for example, relate to continuous processes for the preparation of high-impact polystyrene:

| |
|---|
| (1) US-A-3,243,481 |
| (2) US-A-4,252,911 |
| (3) EP-A-103 657 |
| (4) DE-A-3 339 531 |
| (5) EP-A-67 536 |
| (6) US-A-4,410,659 |
| (7) EP-A-54 141 |
| (8) JP-A-63/199 717 |
| (9) JP-A-63/207 804 |
| (10) JP-A-63/207 803 |
| (11) JP-A-54/070 350. |

(1) and (2) disclose the continuous preparation of ABS polymers, in particular in two or more reaction zones. The preparation is carried out at from 80 to 180° C.; higher temperatures may be used in a subsequent degassing step (removal of the solvent or residual monomer).

Another process for the preparation of ABS polymers is emulsion polymerization, but we will not describe this in greater detail here.

The mechanical properties of ABS molding materials polymerized in bulk or solution on the one hand and prepared in emulsion on the other hand are substantially identical. The advantages of bulk or solution polymers are, in particular, the lower preparation costs (inter alia higher rubber effectiveness, no effluent) and paler inherent color of the product, which consumes less pigment for coloration. However, they have the disadvantage, compared with the result of emulsion polymerization, of lower surface gloss since the bulk- or solution-polymerized ABS contains relatively large dispersed rubber particles. There have therefore been many attempts to overcome this problem by appropriate modifications to the process and thus to prepare ABS by bulk or solution polymerization so that small rubber particles are obtained.

(3) describes a molding material comprising a hard matrix and a soft phase having a rubber particle diameter of less than 1.5 $\mu$m. Only rubbers having a solution viscosity (5% strength in styrene) of at least 120 cP are said to be suitable for the claimed products. ABS materials having rubber particles of 0.5 $\mu$m or less, which are necessary for a gloss equal to that of emulsion ABS, are not obtained by this process.

(4) indicates that, in a continuous process for the preparation of bulk or solution ABS, inter alia the rubber concentration must be kept below 12% by weight in order to give an ABS containing small rubber particles. However, products containing less than 12% by weight of rubber and having a maximum particle size of 0.5 $\mu$m have an industrially unsatisfactory notched impact strength.

(5) describes a bulk suspension polymerization for an ABS polymer for the preparation of mixtures with polyesters. Particle sizes of from 500 to 2000 nm are said to be achieved for the ABS component. By using high initiator concentrations (cf. Example 1) rubber particles having a diameter of less than 1000 nm are obtained. Apart from the fact that the surface gloss of ABS products of this type is not comparable with the molding materials prepared in emulsion (these have, for example, rubber particle diameters of less than 500 nm), this process cannot be used for a continuous solution polymerization since the high reaction rate results, at high conversions, in baked-on deposits in the reactors.

(6) describes a continuous bulk polymerization in an extruder using large amounts of acrylonitrile, giving ABS products having a rubber particle diameter of from 10 to 500 nm. The large excess of acrylonitrile means that the rubber is as it were precipitated; the rubber particles produced do not have hard matrix inclusions, which results in the abovementioned disadvantages. In addition, polymerization in an extruder is an extremely expensive technology for large-scale industry.

However, the use in (8) of rubber of extremely low solution viscosity in a solution polymerization gives rubber particles having a maximum diameter of 750 nm. However, the surface gloss of an ABS produced in this way cannot compete with that of an ABS produced by emulsion polymerization since the rubber particles are too large. The low molecular weight of the rubber means that the rubber particles obtained are poorly filled with hard matrix, which results in the abovementioned disadvantages.

In (7), a "rubber-like polymer" of low solution viscosity is used as an impact modifier for ABS. In the examples, the "rubber-like polymer" is described as a styrene-butadiene block copolymer. Mean rubber particle sizes of from 500 to 600 nm are obtained. (9) to (11) also describe the use of block rubber to prepare ABS containing small rubber particles. However, the high price of the block rubber, which negates the cost advantage of the bulk or solution polymerization process, is disadvantageous.

It is an object of the present invention to provide a process which, using polybutadiene and even in continuous bulk or solution polymerization processes, gives an ABS containing small rubber particles, i.e. having a diameter of less than 500 nm, and thus results in ABS molding materials which can be processed to give high-gloss products.

We have found that this object is achieved by a process for the continuous preparation of ABS polymers by free radical-initiated polymerization of a mixture of from 60 to 90% by weight of at least one vinylaromatic monomer and from 10 to 40% by weight of at least one further ethylenically unsaturated monomer, in the presence of from 5 to 30% by weight, based on the total of monomers, of polybutadiene having a solution viscosity (5% strength by weight in styrene at 25° C.) of from 25 to 95 mPa.s, in the presence or absence of a solvent, in a reactor cascade comprising at least 3 stirred reactors operating essentially without back-mixing and at least some of which having internal cooling tubes for dissipating the heat of polymerization, at from 50 to 180° C., phase inversion taking place in one of the reactors, the essential feature being that the phase inversion takes place in a reactor which contains means for generating a high shear force.

The process according to the invention is carried out in an arrangement comprising at least 3 reactors or reaction zones, preferably a reactor cascade comprising 4 reactors. Preferred reactors are conventional stirred tubular reactors (polymerization towers) with internal cooling tubes and a stirrer which operates between the layers of cooling tubes. However, according to the invention, at least one of the reactors is designed, for example, as an annular gap reactor (cf. figure), i.e. it contains means for generating a high shear force. The preferred annular gap reactor may be of any size, which depends on the intended residence time.

The following is an example of a suitable arrangement for experimental purposes: the interior of the reactor is cylindrical with a length of 1100 mm and a diameter of 220 mm. A hollow, rotatably mounted cylinder is arranged in this reactor as a stirrer in such a manner that a 28.35 mm gap is produced between the inner wall of the reactor and the cylindrical surface of the stirrer. The cylindrical stirrer can be supplied with cooling water via the stirrer shaft. The reaction capacity of the annular gap reactor is 17.7 l. An external cooling jacket is also provided. The annular gap reactor can be filled from the top with a rubber solution or a prepolymerized and pregrafted polymer syrup and at the same time charged separately with initiators or molecular weight regulators. A gear pump installed at the lower outlet of the reactor ensures throughput.

The annular gap reactor is preferably operated in such a manner that the rubber solution containing styrene and acrylonitrile is polymerized in an upstream polymerization tower until just before phase inversion with the aid of a free-radical initiator, in particular a tertbutyl perester which decomposes at low temperature, and without addition of a molecular weight regulator, and is then pumped directly into the annular gap reactor, in which further free-radical initiator and, if desired, a molecular weight regulator are added. The annular gap reactor can also be operated in such a manner that the grafting and phase inversion are carried out jointly. The advantage of an annular gap reactor over known reaction towers is that it generates a constant shear field. The more-uniform shear field gives narrower rubber particle size distributions. This is advantageous for the preparation of a high-gloss ABS containing small rubber particles of narrow size distribution.

If present, the first reaction zone, a polymerization tower with internal cooling tube layers, is used to polymerize the rubber solution comprising polybutadiene, styrene and acrylonitrile, using tert-butyl peresters as initiator, to the extent where phase inversion has not yet taken place. This stage is best determined in a preliminary experiment and the reaction conditions are then maintained. The polybutadiene is grafted during this step. The higher the content of graft copolymer, the better the emulsification action, ie.. the smaller the dispersed rubber particles. In the annular gap reactor, the second reaction zone, the polymerization is continued until phase inversion has taken place, with the aid of tert-butyl peresters as initiator and, if desired, mercaptans as regulator. The internal cylinder is rotated at about 20 to 200 rpm, preferably from 50 to 120 rpm.

The second reaction zone is followed, for example, by two further polymerization towers (3 and 4), in which the polystyrene-acrylonitrile matrix is thermally polymerized to a solids content of at least 50%, but preferably at least 65% by weight. After the fourth polymerization tower the polymer melt is degassed, cooled and granulated in a conventional manner.

The process is particularly intended for the preparation of ABS molding materials in the actual sense, i.e. using styrene and acrylonitrile in a ratio, for example, of from 90:10 to 60:40. Other monomers, e.g. α-methylstyrene, o-, m- or p-methylstyrene or tertbutylstyrene on the one hand and methacrylonitrile on the other hand may also be used under said prerequisites.

For clarity and simplicity, styrene, acrylonitrile and polybutadiene hereinafter generally also include their equivalents; to this extent, the invention is not restricted.

Suitable monomers for the process are styrene and acrylonitrile in a ratio of from 90:10 to 60:40. Equivalent monomers, such as α-methylstyrene, o-, m- and p-methylstyrene, tert-butylstyrene and methacrylonitrile can be used in a conventional manner instead of or together with styrene or acrylonitrile respectively.

A particularly suitable rubber is medium- or high-cis polybutadiene having a molecular weight of from 70,000 to 350,000 (weight average). However, it is in principle also possible to use block rubbers, e.g. of the styrene-butadiene type, in the process. The rubber is preferably employed in an amount of from 5 to 30% by weight, based on the monomers.

Suitable free-radical initiators are graft-active peroxides. Particular preference is given to dibenzoyl peroxide, tert-butyl peroctanoate, tert-butyl perbenzoate, tert-butyl perpivalate and tert-butyl perneodecanoate. The initiator is used in an amount of from 0.01 to 0.5% by weight, based on the monomers, the amount in each case being such that, taking into account temperature and decomposition parameters, the polymerization in each step proceeds until virtually all the initiator has been consumed.

Suitable chain-transfer agents (regulators) are the conventional mercaptans having from 4 to 18 carbon atoms. n-Butyl mercaptan, n-octyl mercaptan and n- and t-dodecyl mercaptan have proven particularly successful. The amount of mercaptan, if used, is generally from 0.01 to 0.3% by weight, based on the monomers.

Solvents which can be used for the process according to the invention are both polar and nonpolar compounds or mixtures thereof.

If the polymerization is carried out in solution, a suitable solvent is toluene, xylene, ethylbenzene, methyl ethyl ketone or tetrahydrofuran, used in an amount of, for example, from 2 to 25% by weight, based on the vinylaromatic monomer. Ethylbenzene is particularly preferred for the process according to the invention.

During the polymerization, in particular after the rubber solution has been prepared or before the high-impact polymers obtained by the process according to the invention have been processed, conventional additives, such as internal glidants, antioxidants or UV stabilizers, and lubricants, fillers and the like can be added to the reaction batch in conventional amounts, known to a person skilled in the art.

The advantage of the process according to the invention is that a high degree of grafting of the rubber and a high graft yield are achieved without problems of heat dissipation, reactor deposits or premature crosslinking occurring. A further advantage is that products of high impact strength or good translucency can be prepared in a targeted manner, depending on the way the reaction is carried out, using one and the same rubber.

High-impact ABS polymers with particles having a diameter of less than 500 nm can be obtained by the process according to the invention.

The molding materials obtained by the process according to the invention can be subjected to conventional thermoplastic processing, i.e. by extrusion, injection molding, calendering, blow molding, compression molding or sintering; moldings are preferably produced by injection molding.

BRIEF DESCRIPTION OF THE DRAWING

The FIGURE shows an annular gap reactor, that is, a reactor which contains means for generating a high shear force.

The material properties used in the examples and comparative experiments below were determined as follows:

The solution viscosity, SV, of the rubber is measured in a 5% strength by weight solution in styrene at 25° C.

The mean particle size is determined by evaluating electron photomicrographs.

The mean particle size is given as the $d_{50}$ value (weight average). The particle size distribution is given as the distribution spread $$\text{spread} = \frac{d_{90} - d_{10}}{d_{50}}$$

A small numerical value corresponds to a narrow particle size distribution.

The viscosity index of the polystyrene-acrylonitrile matrix was measured after separation from the rubber phase as a 0.5% strength solution in dimethylformamide.

The surface gloss was measured on the side faces of injection-molded test boxes using a Dr. Lange laboratory reflectometer in accordance with DIN 67 530, apart from the measurement angle, which was set at 55.8°. The test boxes are 11 cm in length, 4.3 cm in width and 5 cm in height and weigh about 26.27 g. The injection-molding conditions for the production of the test boxes are given in the examples.

The notched impact strength is measured in accordance with DIN 53 453 on moldings injection-molded at 230° C.

The amounts given are generally by weight.

EXAMPLES

For comparison, commercially available ABS molding materials prepared by solution or bulk polymerization were measured for particle size and particle size distribution (spread).

TABLE 1

| Commercial grade | $d_{50}$ [μm] | Spread |
|---|---|---|
| Magnum 213 | 4.0 | 1.3 |
| Magnum 2030 | 1.9 | 1.4 |
| Magnum 2002 | 1.0 | 1.5 |

EXAMPLES 1 TO 6

The polymerization plant comprises the following components:

a) a 250 l rubber dissolution tank (stirrable)

b) a 250 l storage tank (stirrable)

c) an annular gap reactor as described above The hollow cylinder of the stirrer is charged with water as cooling medium. The temperature of the water is controlled by a cascade regulation system.

d) 3 tower reactors (height=1100 mm, diameter=220 mm) with internal, horizontal, parallel layers of cooling tubes and a stirrer operating between the cooling tube layers. Reaction volume 30 l.

e) Degassing and granulation device f) Gear pumps under the reactors for discharge. 18 kg of rubber (Buna HX 500 from Bayer AG, having a solution viscosity of 90 mPa.s as a 5% strength solution in styrene at 25° C.) are dissolved in 22.5 kg of ethylbenzene, 82.1 kg of styrene and 27.4 kg of acrylonitrile with stirring over the course of 5 hours. The finished rubber solution is pumped into the storage tank, from where the polymerization plant is supplied continuously with rubber solution. 20 l of rubber solution per hour are pumped into the polymerization plant.

In the first two reaction zones, the polymerization is carried out at 80° C. by in each case continuously adding tert-butyl perpivalate. In the first polymerization tower, the polymerization is continued to a solids content of 18% by weight, and in the second reaction zone, the annular gap reactor, to a solids content of 28% by weight. To this end, 2.1 g/h of tert-butyl perpivalate are introduced into the first tower and 3.2 g/h into the annular gap reactor. The stirring speed is kept at 150 rpm in the first tower and at 100 rpm in the annular gap reactor. In this way, the rubber is grafted in the first tower, while the phase inversion takes place in the annular gap reactor. In the next two reaction towers, the PSAN matrix is formed by thermal polymerization. In the third polymerization tower, a solids content of 45% by weight is produced at 130° C. and a stirring speed of 50 rpm. In the fourth polymerization tower, a solids content of 70% by weight is obtained by polymerization at 146° C. with stirring at 10 rpm.

All four reaction zones are operated to capacity. tert-Dodecyl mercaptan is additionally metered into the first three reaction zones as molecular weight regulator in various amounts. Table 2 shows the effect of the amount of regulator added on the formation of small rubber particles.

After the fourth polymerization tower, the polymer melt is degassed, cooled and granulated. The throughput of ABS molding material is 14 kg/h.

The molding materials prepared in Examples 5 and 6 no longer satisfy the surface-gloss demands made in industry of injection-molded finished parts.

An ABS prepared by emulsion polymerization and having a comparable rubber content of 17% and a viscosity index of the hard matrix of 80 ml/g has the following surface gloss: condition 1: 68%, condition 2: 47%.

A commercially available ABS prepared by solution or bulk polymerization (Magnum 2030 from Dow Chemicals) having a particle size $d_{50}$ of 1.9 μm and a large particle size spread of 1.4 has a surface gloss of 52% (condition 1) and 18% (condition 2).

TABLE 2

| Example | Amount of regulator metered in (tert-dodecyl mercaptan) | | | | Viscosity index of the matrix [ml/g] | Rubber particle size $d_{50}$ [nm] | Rubber particle spread | Surface gloss | | Notched impact strength | |
|---|---|---|---|---|---|---|---|---|---|---|---|
| | Tower 1 [g/h] | Tower 2 [g/h] | Tower 3 [g/h] | Tower 4 [g/h] | | | | Cond. 1 [%] | Cond. 2 [%] | 23° C. [kJ/m$^2$] | −40° C. [kJ/m$^2$] |
| 1 | — | — | 60 | — | 80 | 0.25 | 0.6 | 72 | 48 | 5 | 5 |
| 2 | — | 18 | 25 | — | 78 | 0.3 | 0.5 | 70 | 46 | 6 | 5 |
| 3 | — | 40 | — | — | 82 | 0.35 | 0.5 | 67 | 39 | 9 | 6 |
| 4 | 5 | 32 | — | — | 83 | 0.4 | 0.5 | 68 | 37 | 8 | 6 |
| 5 | 15 | 18 | — | — | 80 | 0.7 | 0.8 | 62 | 32 | 18 | 9 |
| 6 | 25 | — | — | — | 79 | 2.5 | 1.1 | 57 | 23 | 22 | 13 |

COMPARATIVE EXAMPLES 1 TO 6

The annular gap reactor from Examples 1 to 6 was replaced by a tower reactor. The polymerization was carried out as in Examples 1 to 6 using the same rubber solution under the given conditions. Table 3 shows details of the ABS molding materials obtained.

The particle size distribution of the dispersed rubber particles is broader than for the products listed in Table 2. ABS molding materials prepared in a 4-tower procedure have inferior surface gloss than products from a plant having 4 reaction zones using an annular gap reactor.

COMPARATIVE EXAMPLE 7

The procedure was carried out as in Examples 1 to 6 in a plant having only three consecutive polymerization towers, using the rubber solution from Examples 1 to 6. The throughput was again 20 l/h. In the first polymerization tower, the polymerization was carried out to a solids content of 28% by weight at 80° C. using tert-butyl perpivalate without addition of molecular weight regulator at a stirring speed of 150 rpm, i.e. both grafting and phase inversion took plae in the first polymerization tower. In the next two polymerization towers, the matrix polymerization took place, as in Examples 1 to 6. The molecular weight of the polystyrene-acrylonitrile matrix was set to a viscosity index of 80 ml/g by adding tertdodecyl mercaptan to the second polymerization tower.

The rubber particle size of the ABS molding material prepared in this way is 0.4 μm with a rubber particle spread of 1.5 and a surface gloss of 66% (condition 1) and 32% (condition 2).

TABLE 3

| Comparative Example | Amount of regulator metered in (tert-dodecyl mercaptan) | | | | Viscosity index of the matrix [ml/g] | Rubber particle size $d_{50}$ [nm] | Rubber particle spread | Surface gloss | |
|---|---|---|---|---|---|---|---|---|---|
| | Tower 1 [g/h] | Tower 2 [g/h] | Tower 3 [g/h] | Tower 4 [g/h] | | | | Cond. 1 [%] | Cond. 2 [%] |
| 1 | — | — | 60 | — | 83 | 0.3 | 1.0 | 70 | 46 |
| 2 | — | 17 | 17 | — | 77 | 0.35 | 1.0 | 68 | 42 |
| 3 | — | 28 | — | — | 80 | 0.4 | 1.0 | 68 | 37 |
| 4 | 5 | 20 | — | — | 81 | 0.5 | 1.1 | 68 | 35 |
| 5 | 15 | 15 | — | — | 80 | 0.8 | 1.1 | 60 | 30 |
| 6 | 25 | — | — | — | 80 | 2.5 | 1.5 | 54 | 15 |

We claim:

1. A process for the continuous preparation of ABS polymers by fre radical-initiated polymerization of a mixture of from 60 to 90% by weight of at least one vinylaromatic momomer and from 10 to 40% by weight of at least one different ethylenically unsaturated momomer, in the presence of from 5 to 30% by weight, based on the total of momomers, of polybutadiene having a solution viscosity as measured in 5% strength by weight in styrene at 25° C. of from 25 to 95 mPa.s, in the presence or absence of a solvent, in a reactor cascade comprising at least 3 stirred reactors operating essentially without back-mixing and at least some of which having internal cooling tubes for dissipating the heat of polymerization, at from 50 to 180° C., phase inversion takes place under a high shear force in a reactor which contains means for generating such a shear force.

2. A process as defined in claim 1, wherein the vinylaromatic monomer is styrene and the different monomer is acrylonitrile.

3. The process of claim, wherein the solvent is ethylbenzene.

* * * * *